(12) United States Patent
Chen

(10) Patent No.: US 10,706,408 B2
(45) Date of Patent: Jul. 7, 2020

(54) METHODS AND DEVICES FOR BARCODE BASED COMMUNICATION AND PAYMENT IMPLEMENTATION

(71) Applicant: Alibaba Group Holding Limited, George Town (KY)

(72) Inventor: Ziqiang Chen, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/394,660

(22) Filed: Apr. 25, 2019

(65) Prior Publication Data

US 2019/0251548 A1      Aug. 15, 2019

Related U.S. Application Data

(63) Continuation of application No. PCT/CN2017/110788, filed on Nov. 14, 2017.

(30) Foreign Application Priority Data

Nov. 18, 2016  (CN) .......................... 2016 1 1035515

(51) Int. Cl.
  *G06Q 20/32*     (2012.01)
  *H04M 1/725*     (2006.01)
  *G06Q 20/38*     (2012.01)

(52) U.S. Cl.
  CPC ..... *G06Q 20/3276* (2013.01); *G06Q 20/3223* (2013.01); *G06Q 20/3274* (2013.01);
  (Continued)

(58) Field of Classification Search
  CPC .................. G06Q 20/3274; G06Q 20/3276
  See application file for complete search history.

(56) References Cited

U.S. PATENT DOCUMENTS

| 6,561,428 B2 * | 5/2003 | Meier | ................ G06K 7/10712 235/462.08 |
| 9,600,701 B1 * | 3/2017 | Chien | .................. H04B 10/116 |

(Continued)

FOREIGN PATENT DOCUMENTS

| CN | 102842081 | 12/2012 |
| CN | 104331797 | 2/2015 |

(Continued)

OTHER PUBLICATIONS

Gao et al., "A 2D Barcode-Based Mobile Payment System", Jun. 6, 2009, IEEE, 2009 Third International Conference on Multimedia and Ubiquitous Engineering, whole document (Year: 2009).*

(Continued)

*Primary Examiner* — Hani M Kazimi
*Assistant Examiner* — Adam Hilmantel
(74) *Attorney, Agent, or Firm* — Fish & Richardson P.C.

(57) ABSTRACT

The present application provides a barcode-based communication method, including: rendering first transmission information into a first barcode, and displaying the first barcode for scanning by a peer device; and scanning a second barcode displayed by the peer device, to obtain second transmission information included in the second barcode, where the second transmission information is obtained by the peer device based on a processing result of the first transmission information. According to the technical solutions of the present application, two communication parties can perform bidirectional information transmission by using barcodes, to alleviate information asymmetry caused by unidirectional communication and improve service integrity and security.

20 Claims, 12 Drawing Sheets

(52) U.S. Cl.
CPC ....... *G06Q 20/388* (2013.01); *G06Q 20/3821* (2013.01); *H04M 1/72563* (2013.01); *H04M 2250/52* (2013.01)

(56) References Cited

U.S. PATENT DOCUMENTS

| | | |
|---|---|---|
| 2006/0041638 A1 | 2/2006 | Whittaker et al. |
| 2012/0072353 A1* | 3/2012 | Boone ................ G06Q 20/3276 705/64 |
| 2013/0240622 A1 | 9/2013 | Zhou et al. |
| 2014/0054367 A1* | 2/2014 | Alexeev ............. G06Q 20/3274 235/375 |
| 2015/0088674 A1 | 3/2015 | Flurscheim et al. |
| 2016/0042485 A1* | 2/2016 | Kopel .................... G07C 9/215 705/13 |
| 2018/0032997 A1* | 2/2018 | Gordon ............. G06Q 30/0269 |

FOREIGN PATENT DOCUMENTS

| | | |
|---|---|---|
| CN | 106022767 | 10/2016 |
| CN | 106886892 | 6/2017 |
| GB | 2478712 | 9/2011 |
| JP | 2015212866 A * | 11/2015 |
| TW | 201608499 | 3/2016 |

OTHER PUBLICATIONS

International Preliminary Report on Patentability in International Application No. PCT/CN2017/110788, dated May 21, 2019, 10 pages (with English Translation).

International Search Report and Written Opinion in International Application No. PCT/CN2017/110788, dated Feb. 22, 2018, 14 pages (with English Translation).

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

Extended European Search Report in European Application No. 17871700.5, dated Oct. 16, 2019, 9 pages.

* cited by examiner

METHODS AND DEVICES FOR BARCODE BASED COMMUNICATION AND PAYMENT IMPLEMENTATION

CROSS-REFERENCE TO RELATED APPLICATIONS

This application is a continuation of PCT Application No. PCT/CN2017/110788, filed on Nov. 14, 2017, which claims priority to Chinese Patent Application No. 201611035515.0, filed on Nov. 18, 2016, and each application is hereby incorporated by reference in its entirety.

TECHNICAL FIELD

The present application relates to the field of network communications technologies, and in particular, to methods and devices for barcode based communication and payment implementation.

BACKGROUND

A barcode includes a group of lines and spacing symbols that are arranged based on a specific coding rule, and is used to indicate information about a specific character, digit, or symbol. Examples of barcodes include one-dimensional barcodes and two-dimensional barcodes. The one-dimensional barcode is used to express information by arranging a plurality of black lines and spacings with different widths based on a certain rule. The two-dimensional barcode (also referred to as a quick response code) is used to record information by using a pattern with black and white geometric figures alternated on a (two-dimensional) plane based on a certain rule.

With development of mobile Internet technologies and popularization of intelligent terminals, barcodes are widely applied to various near field services based on user accounts. Two users can implement services such as mobile payment and information sharing between accounts by scanning a one-dimensional barcode or a two-dimensional code.

In the existing technology, barcode scanning communication between two devices is unidirectional communication, and a device that displays the barcode cannot obtain a processing result of information in the barcode from a device that scans the barcode. In response to determining that a service is performed by using the barcode, such unidirectional communication can cause information asymmetry between two communication parties and affect service security and integrity.

For example, in response to determining that a payment service is performed by using a barcode, a merchant cashier terminal with a code scanner obtains a user account after scanning a payment two-dimensional code displayed by a user terminal, and initiates a payment request to a payment server by using the user account, a merchant account, and an amount. After completing a transfer between the user account and the merchant account, the payment server separately sends a payment result to the merchant cashier terminal and the user terminal. In response to determining that a user is in an area such as a new development area, an underground store, or a foreign country that is not covered by a mobile data network, the user terminal cannot immediately receive the payment result while the merchant cashier terminal can receive the payment result because the merchant cashier terminal and the payment server usually communicate with each other through a wired network and can successfully complete the payment. Because of the previous information asymmetry, the user cannot confirm a payment amount and whether the payment is successful. Therefore, it is difficult to ensure the payment security of the user.

SUMMARY

In view of this, the present application provides a barcode-based communication method, including: rendering first transmission information into a first barcode, and displaying the first barcode for scanning by a peer device; and scanning a second barcode displayed by the peer device, to obtain second transmission information included in the second barcode, where the second transmission information is obtained by the peer device based on a processing result of the first transmission information.

The present application provides a barcode-based communication method, including: scanning a first barcode displayed by a peer device, to obtain first transmission information included in the first barcode; generating second transmission information based on a processing result of the first transmission information; and rendering the second transmission information into a second barcode, and displaying the second barcode for scanning by the peer device.

The present application further provides a payment implementation method, and the method is applied to a payer device and includes: rendering payer information including payer account information into a payment barcode, and displaying the payment barcode for scanning by a payee device; and scanning a payment result barcode displayed by the payee device, to obtain a payment result included in the payment result barcode, where the payment result is sent by a payment server to the payee device after the payment server makes a payment from a payer account to a payee account based on a payment request including the payer account information.

The present application provides a payment implementation method, and the method is applied to a payee device and includes: scanning a payment barcode displayed by a payer device, to obtain payer information that is included in the payment barcode and that includes payer account information; sending a payment request to a payment server, and receiving, from the payment server, a payment response that includes a payment result, where the payment request includes the payer account information, payee account information, and a payment amount, and the payment result is generated by the payment server after the payment server makes a payment from a payer account to a payee account based on the payer account information, the payee account information, and the payment amount; and rendering the payment result into a payment result barcode, and displaying the payment result barcode for scanning by the payer device.

The present application further provides a barcode-based communication apparatus, including: a first barcode display unit, configured to render first transmission information into a first barcode, and display the first barcode for scanning by a peer device; and a second barcode scanning unit, configured to scan a second barcode displayed by the peer device, to obtain second transmission information included in the second barcode, where the second transmission information is obtained by the peer device based on a processing result of the first transmission information.

The present application provides a barcode-based communication apparatus, including: a first barcode scanning unit, configured to scan a first barcode displayed by a peer device, to obtain first transmission information included in the first barcode; a second transmission information unit, configured to generate second transmission information based on a processing result of the first transmission information; and a second barcode display unit, configured to render the second transmission information into a second barcode, and display the second barcode for scanning by the peer device.

The present application further provides a payment implementation apparatus, and the apparatus is applied to a payer device and includes: a payment barcode display unit, configured to render payer information including payer account information into a payment barcode, and display the payment barcode for scanning by a payee device; and a payment result barcode scanning unit, configured to scan a payment result barcode displayed by the payee device, to obtain a payment result included in the payment result barcode, where the payment result is sent by a payment server to the payee device after the payment server makes a payment from a payer account to a payee account based on a payment request including the payer account information.

The present application provides a payment implementation apparatus, and the apparatus is applied to a payee device and includes: a payment barcode scanning unit, configured to scan a payment barcode displayed by a payer device, to obtain payer information that is included in the payment barcode and that includes payer account information; a payment result receiving unit, configured to send a payment request to a payment server, and receive, from the payment server, a payment response that includes a payment result, where the payment request includes the payer account information, payee account information, and a payment amount, and the payment result is generated by the payment server after the payment server makes a payment from a payer account to a payee account based on the payer account information, the payee account information, and the payment amount; and a payment result barcode display unit, configured to render the payment result into a payment result barcode, and display the payment result barcode for scanning by the payer device.

The present application further provides a code scanner, including an image acquisition module, where the image acquisition module is configured to obtain an image signal of a barcode displayed by a peer device, and further includes a processing module, a communications module, and a display module; where the processing module is configured to decode the image signal obtained by the image acquisition module into input information, upload the input information to a host by using the communications module, render output information delivered by the host by using the communications module into a barcode, and transmit the barcode to the display module; the communications module is configured to upload the input information to the host, and receive the output information delivered by the host; and the display module is configured to display the barcode obtained by randering the output information.

It can be seen from the previous technical solutions that in the implementations of the barcode-based communication method and apparatus in the present application, after a communication party scans a first barcode displayed by the other communication party, and obtains first transmission information from the first barcode, the communication party generates second transmission information based on a processing result of the first transmission information, and renders the second transmission information into a second barcode for scanning by the other communication party. Therefore, both of the communication parties can perform bidirectional information transmission by using barcodes, to alleviate information asymmetry caused by unidirectional communication, and improve service integrity and security.

In the implementations of the payment implementation method and apparatus in the present application, after scanning the payment barcode that is of the payer device and that includes the payer account information, the payee device sends the payment request to the payment server by using the payer account information, receives the payment result, and renders the payment result into the payment result barcode for scanning by the payer device, so that the payer device can confirm a payment amount and the payment result without connecting to the payment server. Therefore, payment service integrity is ensured, and payment security of a user is improved.

In the implementation of the code scanner in the present application, the processing module renders the output information delivered by the host into the barcode and then displays the barcode on a display screen, so that the code scanner implements a function of displaying a barcode for scanning to a communication peer end, and the code scanner can perform barcode-based bidirectional communication, to provide an implementation basis for improving integrity and security of a service process.

DESCRIPTION OF IMPLEMENTATIONS

Implementation 1 of the present application provides a barcode-based communication method. Assume that a communication party is device A, and the other communication party is device B. Device A displays, to device B, a first barcode obtained by rendering first transmission information. After obtaining the first transmission information through scanning, device B generates second transmission information based on a processing result of the first transmission information, renders the second transmission information into a second barcode, and displays the second barcode to device A for scanning. Device A obtains the second transmission information after scanning the second barcode. As such, barcode-based bidirectional communication between device A and device B is implemented, information asymmetry between device A and device B that is caused by unidirectional communication is alleviated, and a problem in the existing technology is alleviated.

In the present implementation, device A and device B serving as two communication parties can be any device that has computing, storage, display, and barcode scanning functions, for example, a mobile phone, a tablet computer, a notebook computer, or a personal computer (PC) that has a photographing function or an external barcode scanner.

Figure 1:
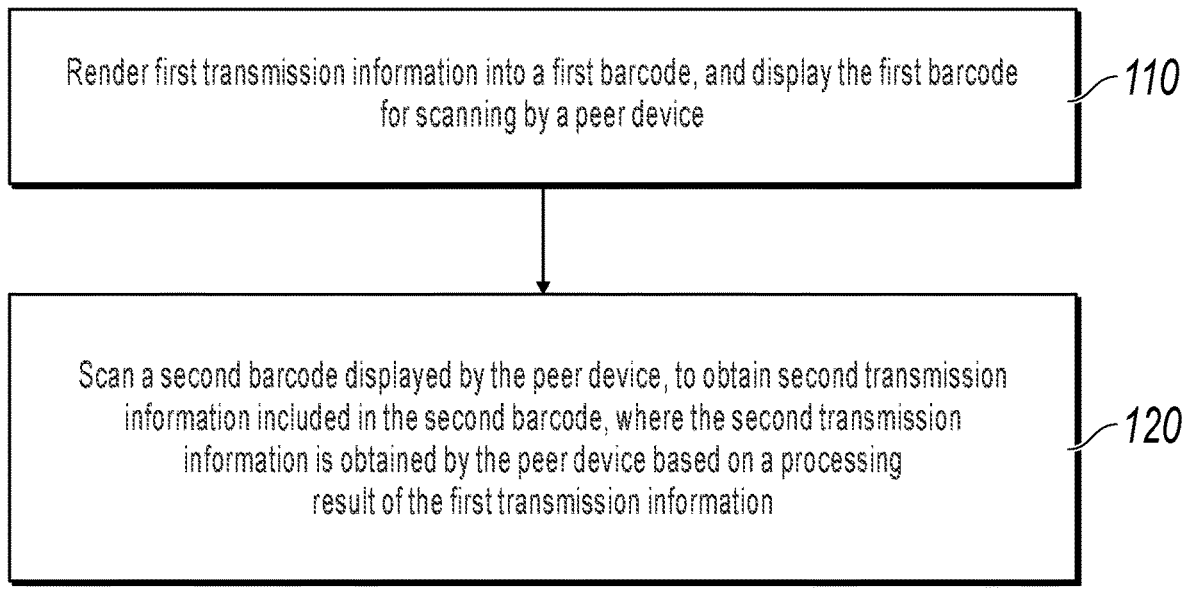
FIG. 1 is a flowchart of a barcode-based communication method that is applied to a communication party, according to Implementation 1 of the present application.
Figure 2:
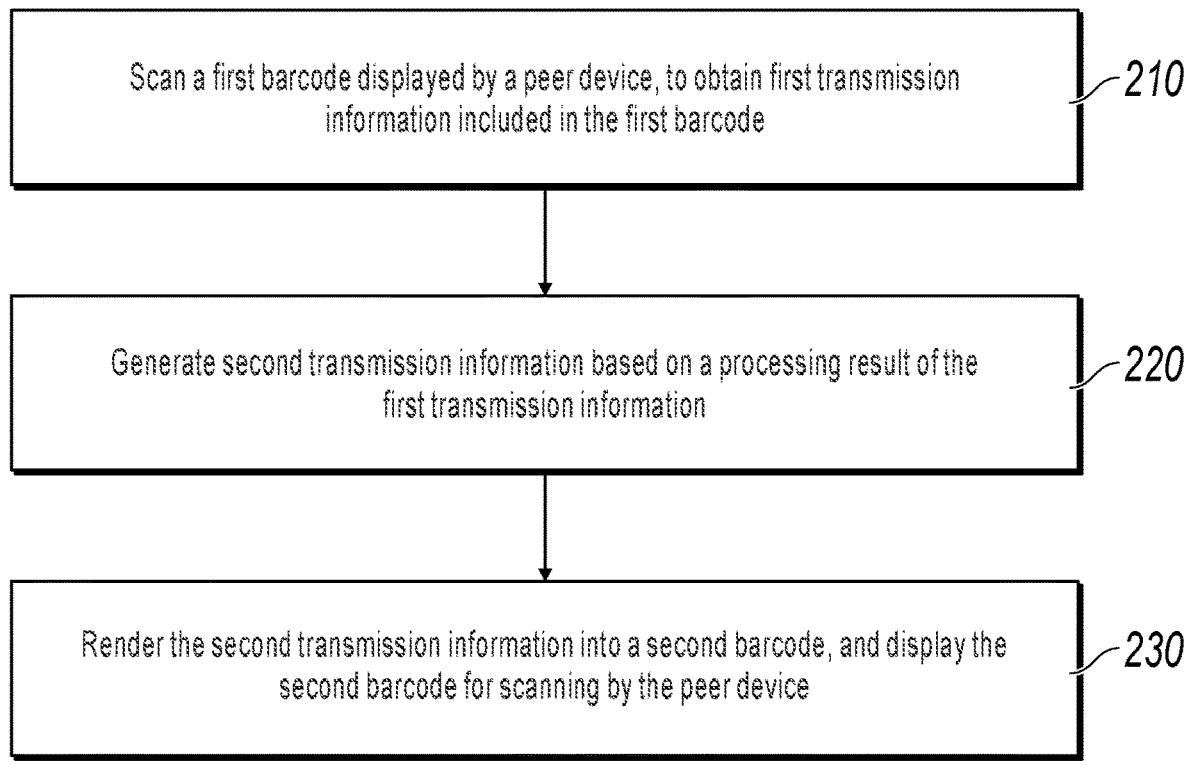
FIG. 2 is a flowchart of a barcode-based communication method that is applied to the other communication party, according to Implementation 1 of the present application.

In the present implementation, a procedure in which the barcode-based communication method is applied to device A is shown in FIG. 1, and a procedure in which the barcode-based communication method is applied to device B is shown in FIG. 2.

Step 110: Device A renders first transmission information into a first barcode, and displays the first barcode for scanning by a peer device.

Step 210: Device B scans the first barcode displayed by the peer device, and obtains the first transmission information included in the first barcode.

Device A renders the first transmission information to be transmitted to device B into the first barcode and then displays the first barcode. Device B scans the first barcode, and extracts the first transmission information from image data of the scanned first barcode.

For a specific method for rendering information into a barcode and extracting the information from image data of the barcode, references can be made to the existing technology. In addition, the barcode in the present implementation can be a one-dimensional barcode or a two-dimensional barcode.

Specific content of the first transmission information can be determined based on information that needs to be transmitted in a service procedure related to device A and device B in an actual application scenario, and is not limited in the present implementation. The first transmission information can include one or more types of service information, device control information, and communication control information.

The service information is service data related to a service procedure.

The device control information is used to control a working status parameter of device B, or control device B to perform a specified function operation, or not only control a working status parameter of device B but also control device B to perform a specified function operation. The working status parameter includes various parameter values or status values such as screen brightness of device B, a barcode display time duration or a barcode display area and location that can be set or modified by a running unit such as an application, a process, or a thread on device B. The function operation includes various functions such as turning on/off a camera, photographing, recording, lighting up a screen, and turning off the screen that can be started, run, and disabled by a running unit such as an application, a procedure, or a thread on device B.

The communication control information is used to notify device B of a current progress, a subsequent procedure, or a current progress and a subsequent procedure of information exchange. The current progress is an information exchange step that is in progress or completed on device A. For example, information 1 is received, or information 2 is being processed. The subsequent procedure is a requirement of device A for device B in subsequent communication, for example, returning an information receiving acknowledgement, or returning an information processing result.

Step 220: Device B generates second transmission information based on a processing result of the first transmission information.

After extracting the first transmission information, device B processes the first transmission information based on a requirement of a service procedure in an actual application scenario, to obtain the second transmission information. The second transmission information can be generated after device B locally processes the first transmission information; or device B can send the first transmission information to another device, and then a processing result returned by the another device is used as the second transmission information; or device B can process the first transmission information, send an intermediate processing result to another device, and generate the second transmission information based on a response returned by the another device. Implementations are not limited thereto.

As described above, the first transmission information can include one to more types of the service information, the device control information, and the communication control information. In response to determining that the first transmission information includes the device control information, after device B extracts the first transmission information, device B performs at least one of the following: changing the working status parameter of device B, or performing the specified function operation on device B based on the device control information in the first transmission information. For example, in response to determining that the first transmission information includes device control information "increasing screen brightness", the screen brightness of device B is increased in response to determining that the screen brightness of device B does not reach a maximum value; or in response to determining that the first transmission information includes device control information "turning off a camera", device B turns off the camera of device B.

In response to determining that the first transmission information includes the communication control information, device B learns of at least one of the current progress or the subsequent procedure of the information exchange with device A based on the communication control information in the first transmission information; and generates the second transmission information based on at least one of the current progress or the subsequent procedure of the information exchange. For example, in response to determining that the first transmission information includes communication control information "returning a receiving acknowledgement", device B generates second transmission information "information is received"; or in response to determining that the first transmission information includes communication control information "returning an information processing result", device B uses the processing result as the second transmission information after processing the first transmission information ends.

Step 230: Device B renders the second transmission information into a second barcode, and displays the second barcode for scanning by the peer device.

Step 120: Device A scans the second barcode displayed by the peer device, to obtain the second transmission information included in the second barcode, where the second transmission information is generated by the peer device based on the processing result of the first transmission information.

Device B renders the generated second transmission information into the second barcode, and displays the second barcode. Device A scans the second barcode displayed by device B, and extracts the second transmission information from image data of the second barcode.

Similarly, device B can encapsulate at least one of the device control information or the communication control information in the second transmission information. In response to determining that the second transmission information includes device control information, after device A extracts the device control information, device A performs at least one of the following: changing a working status parameter of device A, or performing a specified function operation based on the device control information; or in response to determining that the second transmission information includes communication control information, after device A extracts the communication control information, device A performs at least one of the following: learning of a current progress of information exchange with device B, or performing a subsequent process of the information exchange with device B based on the communication control information.

For example, in response to determining that the second transmission information includes communication control information "continuing to scan the next barcode", device A continues to invoke a camera to scan a screen of device B until the next barcode (a barcode different from the currently received barcode, a barcode displayed after the screen of device B is turned off and lit up again, or the subsequently displayed barcode) is scanned.

By using the previous steps, bidirectional communication between device A and device B can be performed by scanning barcodes. After the communication between the two parties ends, device A and device B can send prompt signals such as a prompt tone or vibration to respective users, to notify the users that the communication ends. Device A and device B can notify, by using communication control information in the barcode, each other that the communication ends, or a running unit such as an application or a process that runs a service procedure can end the communication. Implementations are not limited thereto.

It can be seen that in the present implementation, device A displays, to device B, the first barcode obtained by rendering the first transmission information. Device B scans the first barcode displayed by device A and obtains the first transmission information from the first barcode, generates the second transmission information based on the processing result of the first transmission information, and renders the second transmission information into the second barcode for scanning by Device A. As such, barcode-based bidirectional communication between device A and device B is implemented, information asymmetry between device A and device B that is caused by unidirectional communication is alleviated, and service integrity and security are improved.

Implementation 2 of the present application provides a payment implementation method. A payee device scans a payment barcode, of a payer device, that includes payer account information. After requesting a payment from a payment server by using the payer account information, the payee device renders a payment result into a payment result barcode, and displays the payment result barcode to the payer device for scanning, so that the payer device can immediately learn of the payment result without connecting to the payment server. Therefore, payment security of a user is improved, and a problem in the existing technology is alleviated.

Figure 3:
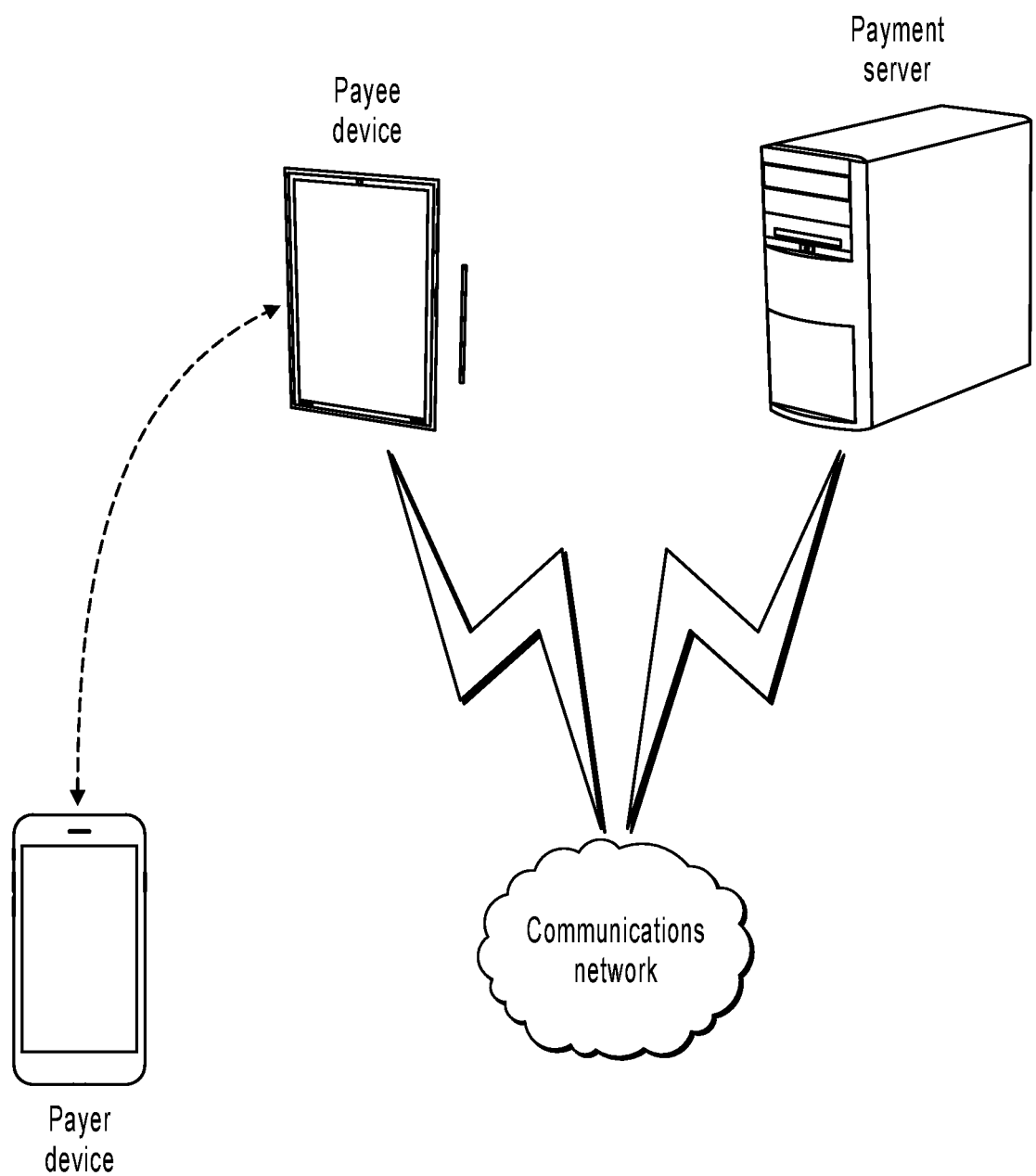
FIG. 3 is a network structure diagram of an application scenario, according to Implementation 2 of the present application.

FIG. 3 shows a network structure of an application scenario, according to the present implementation. The payee device and the payment server can access each other through a communications network, and the payer device and the payee device perform near field communication by scanning a barcode. The payee device and the payer device can be any device that has computing, storage, display, and barcode scanning functions, for example, a mobile phone, a tablet computer, a notebook computer, or a personal computer (PC) that has a photographing function or an external barcode scanner. The payee device can be a cashier terminal that has a barcode scanning and display function. The payment server can be one physical or logical server, or can be two or more physical or logical servers that take different responsibilities and cooperate with each other to implement functions of the payment server in the present implementation.

Figure 4:
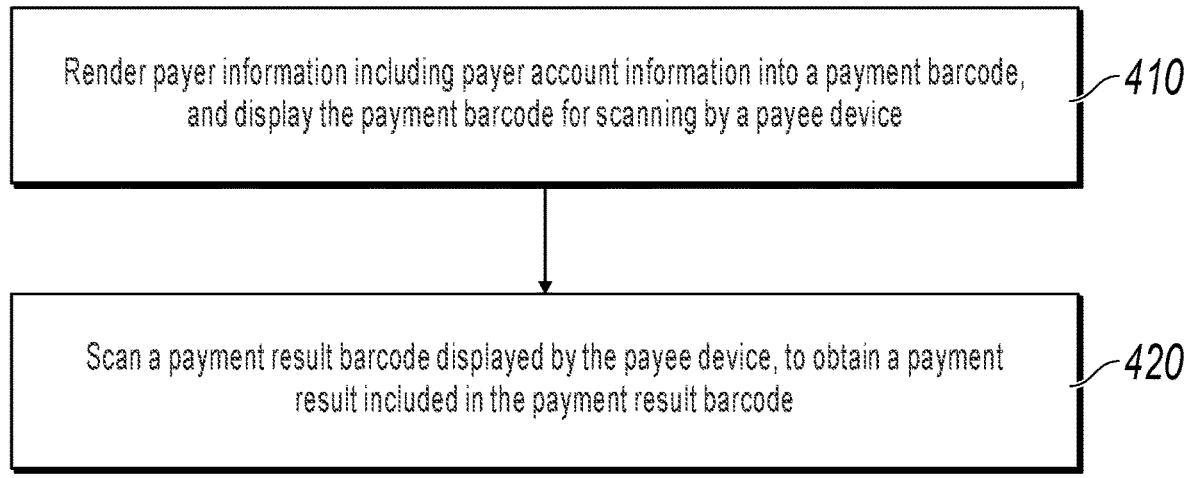
FIG. 4 is a flowchart of a payment implementation method that is applied to a payer device, according to Implementation 2 of the present application.
Figure 5:
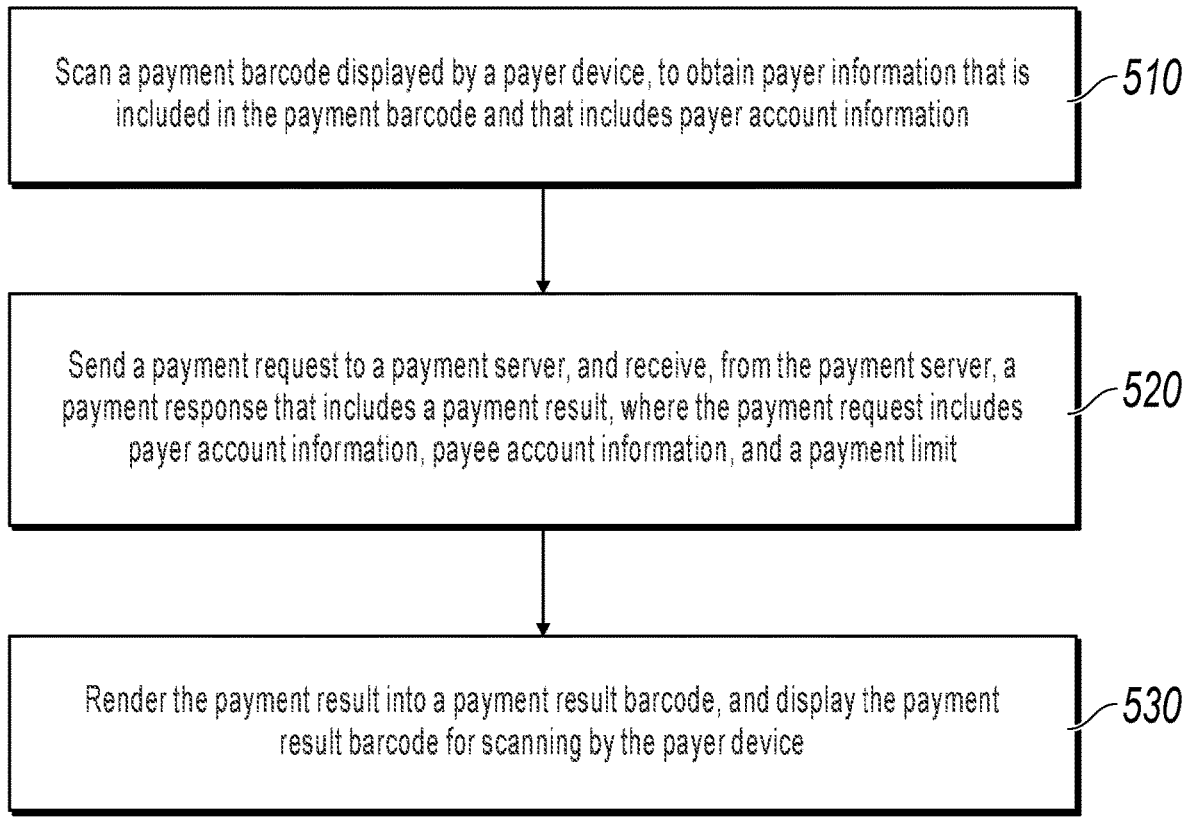
FIG. 5 is a flowchart of a payment implementation method that is applied to a payee device, according to Implementation 2 of the present application.

In the present implementation, a procedure in which a payment implementation method is applied to the payer device is shown in FIG. 4, and a procedure in which the payment implementation method is applied to the payee device is shown in FIG. 5. For content in the present implementation that is the same as that in Implementation 1, details are omitted here for simplicity. For details, references can be made to Implementation 1.

Step 410: The payer device renders payer information including payer account information into a payment barcode, and displays the payment barcode for scanning by the payee device.

Step 510: The payee device scans the payment barcode displayed by the payer device, to obtain the payer information that is included in the payment barcode and that includes the payer account information.

After receiving a payment operation performed by a user serving as a payer, the payer device generates the payer information, and the payer information includes the payer account information. The payer account information can be any information that can uniquely represent the payer account on a payment server, such as a registered user name of the payer, or an account code of a payer account in a payment system. In addition, the payer device can further add at least one of device control information or communication control information to the payer information. The payer device renders the payer information into the payment barcode, and displays the barcode on a screen for scanning by the payee device.

The payee device scans the payment barcode displayed by the payer device, obtains the payer information by parsing image data of the payment barcode, and extracts the payer account information from the payer information.

For a specific method for rendering information into a barcode and extracting the information from image data of the barcode, references can be made to the existing technology. In addition, the barcode in the present implementation can be a one-dimensional barcode, a two-dimensional barcode, or another type of barcode.

Step 520: The payee device sends a payment request to a payment server, and receives, from the payment server, a payment response that includes a payment result, where the payment request includes the payer account information, payee account information, and a payment amount, and the payment result is generated by the payment server after the payment server makes a payment from a payer account to a payee account based on the payer account information, the payee account information, and the payment amount.

The payee device encapsulates the payer account information, the payee account information, and the payment amount from the payer to a payee in the payment request, and sends the payment request to the payment server. Similarly, the payee account information can be any information that can uniquely represent the payee account on the payment server.

The payment server transfers an amount equal to the payment amount from the payer account to the payee account. After the transfer succeeds, a payment success is used as the payment result. In response to determining that the transfer fails due to an abnormal state of the payee account or the payer account, an insufficient balance of the payer account, etc., a payment failure is used as the payment result. The payment server encapsulates the payment result in the payment response, and sends the payment response to the payee device.

Step 530: The payee device renders the payment result into a payment result barcode, and displays the payment result barcode for scanning by the payer device.

Step 420: The payer device scans the payment result barcode displayed by the payee device, to obtain the payment result included in the payment result barcode, where the payment result is sent by the payment server to the payee device after the payment server makes the payment from the payer account to the payee account based on the payment request including the payer account information.

The payee device receives the payment response, extracts the payment result from the payment response, performs corresponding service processing based on whether the payment is successful, renders the payment result into the payment result barcode, and displays the payment result barcode on a screen.

The payer device scans the payment result barcode displayed on the screen of the payee device, and obtains the payment result by parsing image data of the payment result barcode.

After the payee device scans the payment barcode displayed by the payer device, it takes the payee device a long time to display the payment result barcode for scanning by the payer device. In this period, the payer device keeps scanning the screen of the payee device and consumes a lot of power. The payer device is usually a mobile device of a user, and power consumption is a key indicator.

Therefore, in an example, after obtaining the payer information included in the payment barcode, the payee device can render waiting process control information into a waiting process control barcode, and display the waiting process control barcode on the screen for scanning by the payer device. The waiting process control information includes device control information, and the device control information is used to perform the at least one of the following: changing a working status parameter of the payer device, or performing a specified function operation. For example, the waiting process control information can be adjusting screen brightness, turning off a camera for a predetermined time and then turning on the camera, or a combination thereof. After scanning the waiting process control barcode, the payer device performs at least one of the following: changing the working status parameter of the payer device, or performing the specified function operation based on the device control information included in the waiting process control barcode, to save power.

In response to determining that the payee device displays the waiting process control barcode after obtaining the payer information, to reduce power consumption of the payer device, the payer device further needs to continue to scan the payment result barcode of the payee device. It can be specified in a payment procedure of the payer and a cashier procedure of the payee that after scanning the payment barcode, the payee device successively displays two barcodes to the payer device, to respectively transmit control information and the payment result, and the payer device scans, under control of a running unit such as an application or a process that runs the payment procedure, the two barcodes successively displayed by the payee device; or the payee device can add communication control information to the waiting process control information, the communication control information includes a notification message instructing the payer device to continue to scan the next barcode, and, after scanning the waiting process control barcode, the payer device extracts the communication control information and can learn that the payee can further display the next barcode for scanning by the payer device.

In another example, after the payment barcode is displayed for a predetermined display time, the payer device can start to scan the payment result barcode. Specifically, the payer device can start a timer in response to determining to display the payment barcode on the screen, the predetermined display time is set on the timer, and the payer device starts to scan the payment result barcode in response to determining that the timer expires. The predetermined display time can be determined based on factors such as a processing speed of the payee device, or a time required for information exchange between the payee and the payment server. Delaying the start of scanning can save power of the payer device.

In some application scenarios, in response to determining that the payer device can normally communicate with the payment server, the payment server can directly send the payment result to the payer device. A method in which the payer device is notified of the payment result by using the payment result barcode in the present implementation is used only in response to determining that the payer device cannot communicate with the payment server. The following two implementations can be used in these application scenarios:

Implementation 1: In response to determining that the payer device cannot normally communicate with the payment server, in response to determining that the payer device generates the payer information, the payer device adds, to the payer information, communication control information instructing to return the payment result. The communication control information is used to request the payee device to feed back the payment result to the payer device by using a barcode. In addition, after displaying the payment barcode, the payer device scans the screen of the payee device, to receive information returned by the payee device by using the barcode. In response to determining that the payer device can normally communicate with the payment server, the payer device does not add, to the payer information, communication control information instructing to return the payment result, and does not need to scan the payment result barcode of the payee device. In response to determining that the payer information includes the communication control information instructing to return the payment result, the payee device renders the payment result into the payment result barcode, and displays the payment result barcode for scanning by the payer device; otherwise, the payee device does not need to generate or display the payment result barcode.

Implementation 2: In response to determining that the payer device cannot normally communicate with the payment server, after the payer device displays the payment barcode, the payer device scans the payment result barcode displayed by the payee device, to obtain the payment result included in the payment result barcode; otherwise, the payer device does not need to scan the payment result barcode of the payee device. In response to determining that the payment server cannot normally communicate with the payer device, and the payment server generates the payment response, the payment server encapsulates, in the payment response, a notification indicating that the payer device goes offline. In response to determining that the payment response received from the payment server includes the notification indicating that the payer device goes offline, the payee device renders the payment result into the payment result barcode, and displays the payment result barcode for scanning by the payer device; otherwise, the payee device does not need to generate or display the payment result barcode.

It can be seen that in the present implementation, the payee device scans the payment barcode that is of the payer device and that includes the payer account information, sends the payment request to the payment server by using the payer account information, receives the payment result, renders the payment result into the payment result barcode, and displays the payment result barcode to the payer device for scanning, so that the payer device can confirm a payment amount and the payment result without connecting to the payment server. As such, payment service integrity and payment security of the user are improved.

In the existing technology, a code scanner used by a payee can usually only scan a barcode on another object or device, and does not have a display screen or a function of generating and displaying a barcode. Such a code scanner or a host connected to the code scanner cannot be used as a party that performs bidirectional communication by using barcodes in the present application. Therefore, Implementation 3 of the present application provides a code scanner. The code scanner has a display screen, and has a function of receiving information delivered by a host and rendering the information into a barcode for display. In the present implementation of the present invention, such a code scanner or a host connected to the code scanner can be used as a party of bidirectional communication, to alleviate information asymmetry caused by unidirectional communication.

The code scanner in the present implementation is connected to the host by using a wired or wireless communications interface, and can upload information to the host and receive information delivered by the host. The host can be any device that has computing and storage functions. In the present implementation, a type of the host, a communication method between the host and the code scanner, and a communications protocol are not limited.

Figure 6:
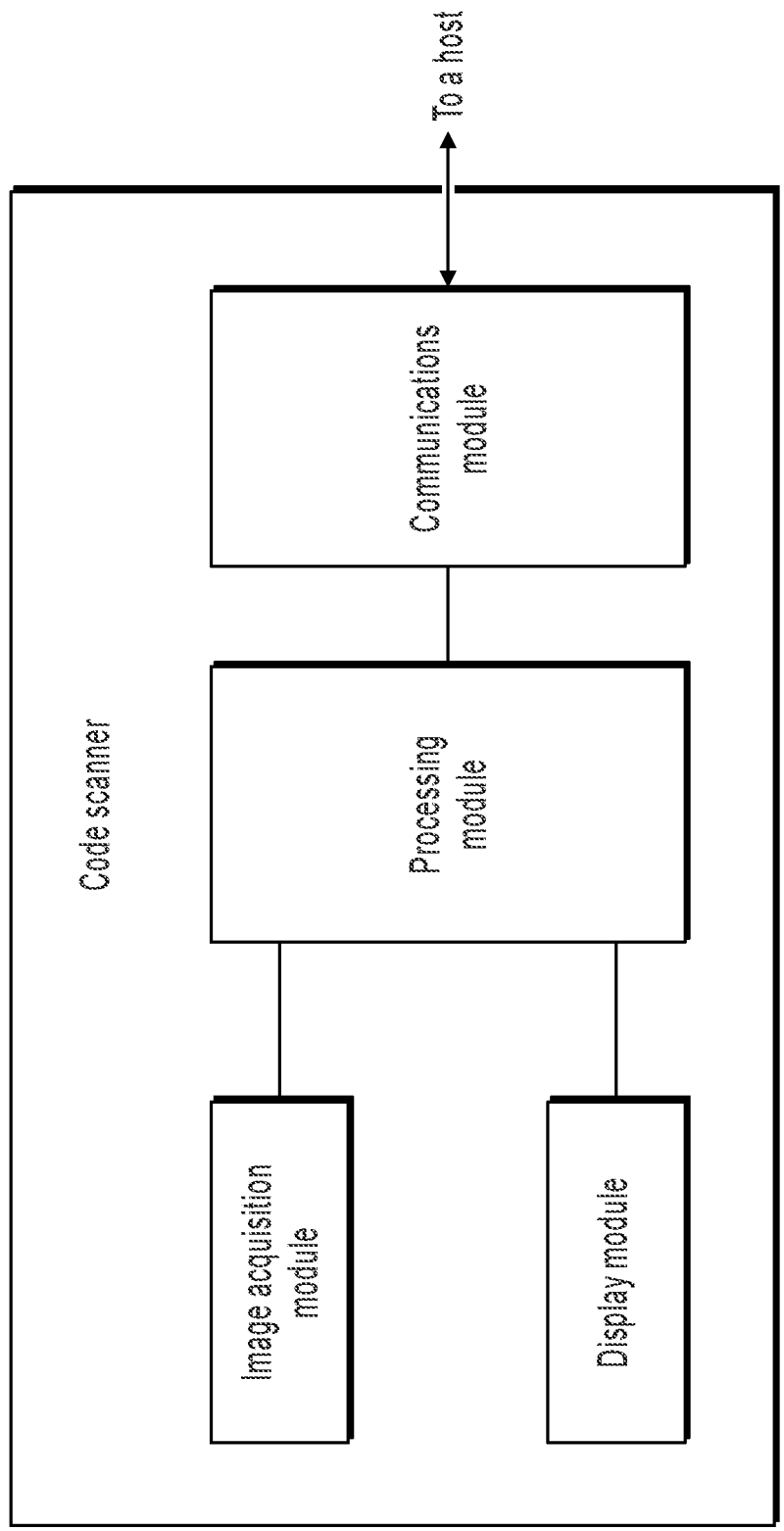
FIG. 6 is a schematic structural diagram of a code scanner, according to Implementation 3 of the present application.

In the present implementation, a structure of the code scanner is shown in FIG. 6, and includes an image acquisition module, a display module, a processing module, and a communications module.

The image acquisition module is configured to obtain an image signal of a barcode displayed by a communication peer device.

The processing module is configured to decode the image signal obtained by the image acquisition module into input information, upload the input information to the host by using the communications module, render output information delivered by the host by using the communications module into a barcode, and transmit the barcode to the display module.

The communications module is configured to upload the input information to the host, and receive the output information delivered by the host.

The display module is configured to display the barcode obtained by randering the output information.

Specifically, during scanning, the image acquisition module obtains, through photographing, reflection based imaging, etc., the image signal of the barcode displayed by the communication peer device, and transmits the image signal to the processing module. The processing module decodes the image signal obtained by the image acquisition module into the input information, and transmits the input information to the communications module. The communications module uploads the input information from the processing module to the host. To display the barcode, the host delivers the output information to the communications module. The communications module transmits the received output information to the processing module. The processing module renders the output information delivered by the host into the barcode, and then transmits the barcode to the display module. The display module displays the generated barcode on a display screen (the display module includes the display screen).

The previous constituent modules of the code scanner are usually encapsulated inside a housing of the code scanner. In some application scenarios, one side of the housing of the code scanner is an open side or a side made of a transparent material, the display screen is disposed inside an opposite side of the open side or the transparent side, and a distance between the display screen and the open side or the transparent side is determined based on a focal length of a front-facing camera of a mainstream mobile phone model.

Specifically, a housing with an open side forms a horizontally placed barrel-type structure. An unclosed side of a barrel forms the open side of the housing. A cross-sectional shape of the barrel can be a rectangle, a round rectangle, a circle, an ellipse, etc., and is not limited. The display screen in the display module is installed on the opposite side (the opposite side can be considered as a bottom of the horizontally placed barrel) of the open side, and is installed inside the housing. In other words, content displayed on the display screen can be seen from the open side. Another side of a housing having a transparent side can or cannot be made of a transparent material. The display screen is installed on an opposite side of the open side or the transparent side, and is installed inside the housing. In other words, content displayed on the display screen can be seen through the transparent side.

Focal lengths of front-facing cameras of various mainstream mobile phone models are collected, and a distance close to the focal lengths is used as a distance between the display screen and the open side or the transparent side, so that in response to determining that a user places a screen of a mobile phone near the open side or the transparent side, a barcode displayed on the display screen can be conveniently displayed, to facilitate an operation of the user.

It can be seen that in the present implementation, the code scanner can not only scan the barcode of the communication peer device to obtain the input information, but also render the output information to be transmitted to the peer device into a barcode for display, so that the peer device scans the barcode. The code scanner has a function of performing a barcode-based bidirectional communication, to provide an implementation basis for improving integrity and security of a service process.

In an application example of the present application, a merchant cashier terminal is externally connected to the code scanner in Implementation 3, scans a payment two-dimensional code displayed by a payment application (app) of a third-party payment platform on the mobile phone of the user, and performs mobile payment by using a payment server of the third-party payment platform. A payment procedure is as follows:

The user opens the payment app on the mobile phone and confirms a payment operation. In response to determining that the payment app can communicate with the payment server, user account information is used as payer information; otherwise, user account information and communication control information instructing to return a payment result are used as payer information. The payment app renders the payer information into a payment two-dimensional code and displays the payment two-dimensional code on the screen of the mobile phone. In response to determining that the payment app cannot communicate with the payment server, the payment app turns on a front-facing camera, to start to scan the two-dimensional code.

The user aims the screen of the mobile phone at a code scanner of a merchant. A cashier person of the merchant starts the code scanner, to scan the payment two-dimensional code. The code scanner uploads the payer information obtained through decoding to the merchant cashier terminal.

The merchant cashier terminal extracts the user account information from the payer information, encapsulates, in a payment request, the user account information, merchant account information, and order information including a payment amount, and sends the payment request to the payment server, to request deduction for such a transaction.

The payment server transfers the payment amount from a user account to a merchant account. The payment result is a payment success. The payment result is encapsulated in a payment response and is sent to the merchant cashier terminal. In addition, the payment result is pushed to the payment app of the mobile phone of the user. In response to determining that the payment server cannot normally communicate with the payment app, the payment app cannot receive in time a push message including the payment result.

The merchant cashier terminal receives the payment response from the payment server, obtains the payment result from the payment response, and performs a service processing procedure after payment succeeds. In response to determining that the payer information from the mobile phone of the user does not include the communication control information instructing to return the payment result, the payment procedure ends; otherwise, the merchant cashier terminal sends the payment result to the code scanner as the output information, and the code scanner renders the payment result into a payment result two-dimensional code and displays the payment result two-dimensional code on the display screen of the code scanner.

The payment app of the mobile phone of the user scans the payment result two-dimensional code, obtains the payment result after decoding the payment result two-dimensional code, and displays, to the user, a message indicating the payment amount and a successful payment.

Figure 7:
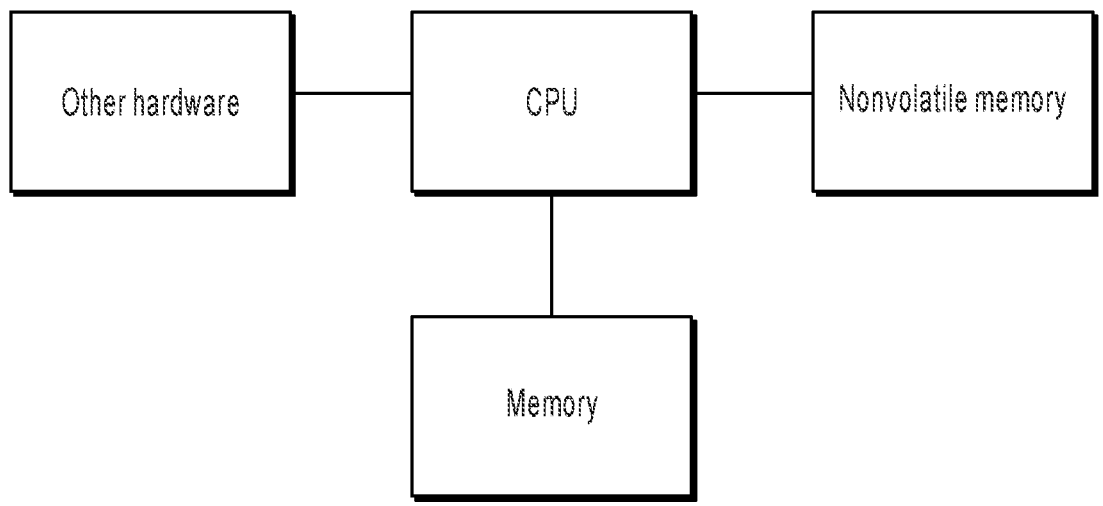
FIG. 7 is a structural diagram of hardware of a device, according to Implementation 1 or Implementation 2 of the present application.

Corresponding to the procedure implementations in Implementation 1 and Implementation 2, implementations of the present application further provide a barcode-based communication apparatus applied to a communication party, a barcode-based communication apparatus applied to the other communication party, a payment implementation apparatus applied to a payer device, and a payment implementation apparatus applied to payee device. All the four apparatuses can be implemented by using software, hardware, or a combination of software and hardware. Software implementation is used as an example. As a logical apparatus, the software is formed after a central processing unit (CPU) in a device in which the software is located reads a corresponding computer program instruction to a memory for running. In terms of hardware, in addition to a CPU, a memory, and a nonvolatile memory shown in FIG. 7, the device in which the apparatus is located usually further includes at least one of other hardware such as a chip for sending or receiving a radio signal, or other hardware such as a card configured to implement a network communication function.

Figure 8:
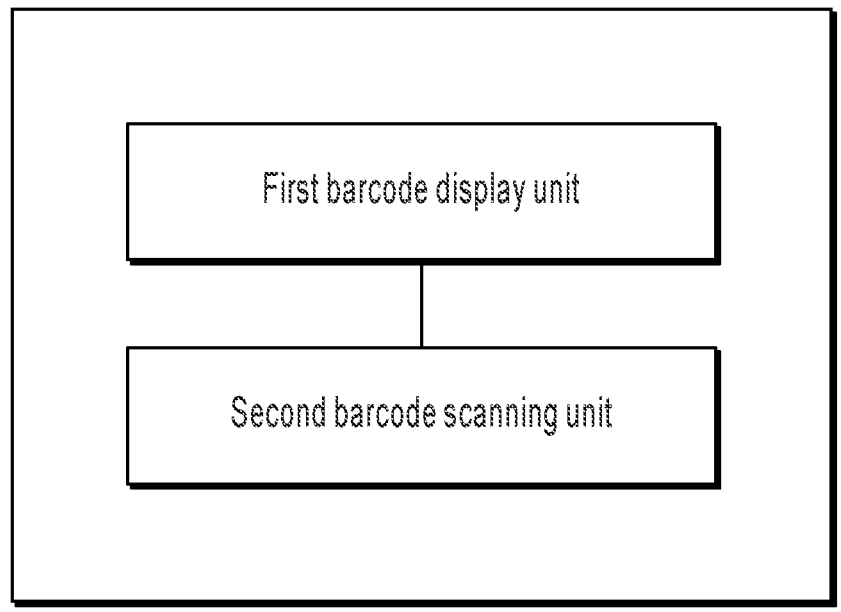
FIG. 8 is a logical structural diagram of a barcode-based communication apparatus that is applied to a communication party, according to an implementation of the present application.

FIG. 8 shows a barcode-based communication apparatus, according to an implementation of the present application. The apparatus includes a first barcode display unit and a second barcode scanning unit. The first barcode display unit is configured to render first transmission information into a first barcode, and display the first barcode for scanning by a peer device. The second barcode scanning unit is configured to scan a second barcode displayed by the peer device, to obtain second transmission information included in the second barcode. The second transmission information is obtained by the peer device based on a processing result of the first transmission information.

Optionally, the first transmission information includes at least one of device control information or communication control information, the device control information is used to perform at least one of the following: controlling a working status parameter of the peer device, or performing a specified function operation, and the communication control information is used to notify the peer device of at least one of a current progress or a subsequent procedure of information exchange.

Optionally, the second transmission information includes at least one of device control information or communication control information. The apparatus further includes a device and communication control unit, where the device and communication control unit is configured to perform at least one of the following: changing a working status parameter of a local device, or performing a specified function operation based on the device control information in the second transmission information; or learning of a current progress of information exchange with the peer device, or performing a subsequent procedure of the information exchange with the peer device based on the communication control information in the second transmission information.

Optionally, the apparatus further includes a communication end prompt unit, where the communication end prompt unit is configured to send a prompt signal after communication with the peer device ends.

Figure 9:
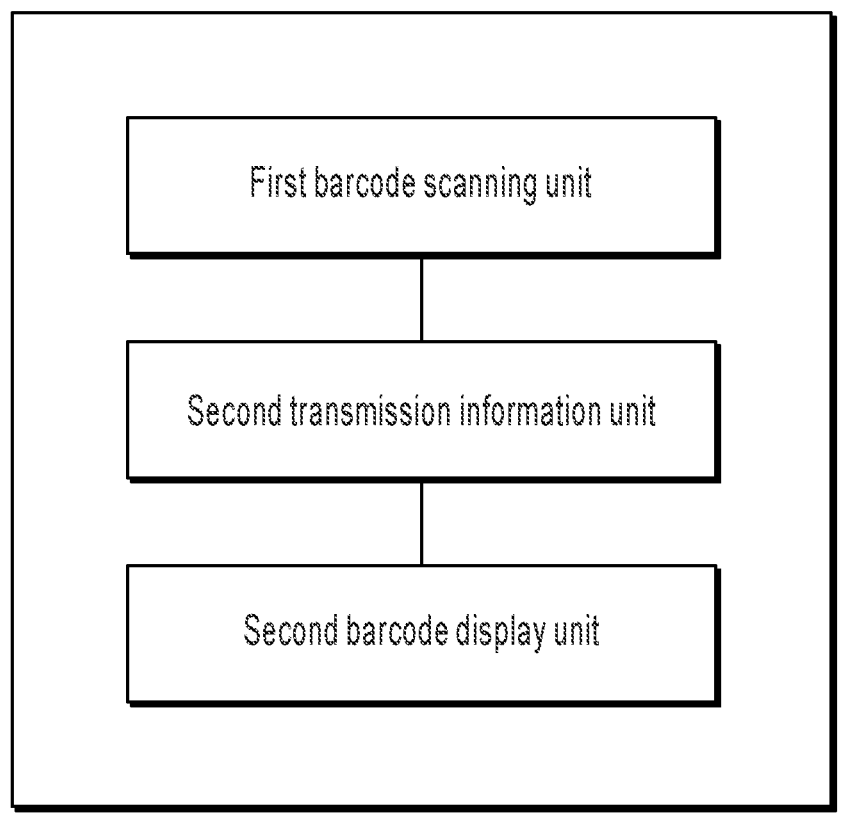
FIG. 9 is a logical structural diagram of a barcode-based communication apparatus that is applied to the other communication party, according to an implementation of the present application.

FIG. 9 shows a barcode-based communication apparatus, according to an implementation of the present application. The apparatus is applied to a device of the other communication party, and includes a first barcode scanning unit, a second transmission information unit, and a second barcode display unit. The first barcode scanning unit is configured to scan a first barcode displayed by a peer device, to obtain first transmission information included in the first barcode. The second transmission information unit is configured to generate second transmission information based on a processing result of the first transmission information. The second barcode display unit is configured to render the second transmission information into a second barcode, and display the second barcode for scanning by the peer device.

Optionally, the first transmission information includes device control information. The apparatus further includes a device control unit, where the device control unit is configured to perform at least one of the following: changing a working status parameter of a local device, or performing a specified function operation based on the device control information in the first transmission information.

Optionally, the first transmission information includes communication control information. The second transmission information unit is configured to learn of at least one of a current progress or a subsequent procedure of information exchange with the peer device based on the communication control information in the first transmission information; and generate the second transmission information based on at least one of the current progress or the subsequent procedure of the information exchange.

Optionally, the second transmission information includes at least one of device control information or communication control information, the device control information is used to perform at least one of the following: controlling a working status parameter of the peer device, or performing a specified function operation, and the communication control information is used to notify the peer device of at least one of a current progress or a subsequent procedure of information exchange.

Optionally, the apparatus further includes a communication end prompt unit, where the communication end prompt unit is configured to send a prompt signal after communication with the peer device ends.

Figure 10:
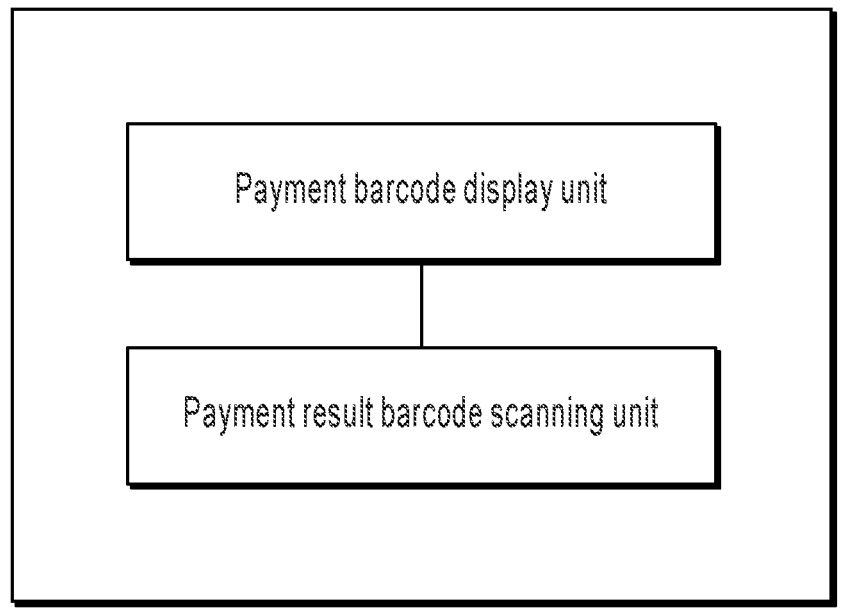
FIG. 10 is a logical structural diagram of a payment implementation apparatus that is applied to a payer device, according to an implementation of the present application.

FIG. 10 shows a payment implementation apparatus, according to an implementation of the present application. The apparatus is applied to a payer device, and includes a payment barcode display unit and a payment result barcode scanning unit. The payment barcode display unit is configured to render payer information including payer account information into a payment barcode, and display the payment barcode for scanning by a payee device. The payment result barcode scanning unit is configured to scan a payment result barcode displayed by the payee device, to obtain a payment result included in the payment result barcode. The payment result is sent by a payment server to the payee device after the payment server makes a payment from a payer account to a payee account based on a payment request including the payer account information.

Optionally, the payment result barcode scanning unit is configured to start to scan the payment result barcode after the payment barcode is displayed for a predetermined display time.

In an implementation, the payment result barcode scanning unit is configured to: in response to determining that the payer device cannot communicate with the payment server, scan the payment result barcode displayed by the payee device, to obtain the payment result included in the payment result barcode.

In another implementation, in response to determining that the payer device cannot communicate with the payment server, the payer information further includes: communication control information instructing to return the payment result, to instruct the payee device to generate and display the payment result barcode.

In an example, the apparatus further includes a waiting process control barcode scanning unit, where the waiting process control barcode scanning unit is configured to: before the payment result barcode displayed by the payee device is scanned, scan a waiting process control barcode displayed by the payee device, and perform at least one of the following: changing a working status parameter of the payer device, or performing a specified function operation based on device control information included in the waiting process control barcode.

In the previous example, the device control information includes at least one of the following: turning down screen brightness, or turning off a camera for a predetermined time and then turning on the camera.

In the previous example, the waiting process control barcode further includes communication control information, and the communication control information includes a notification message that instructs the payer device to continue to scan the next barcode.

Figure 11:
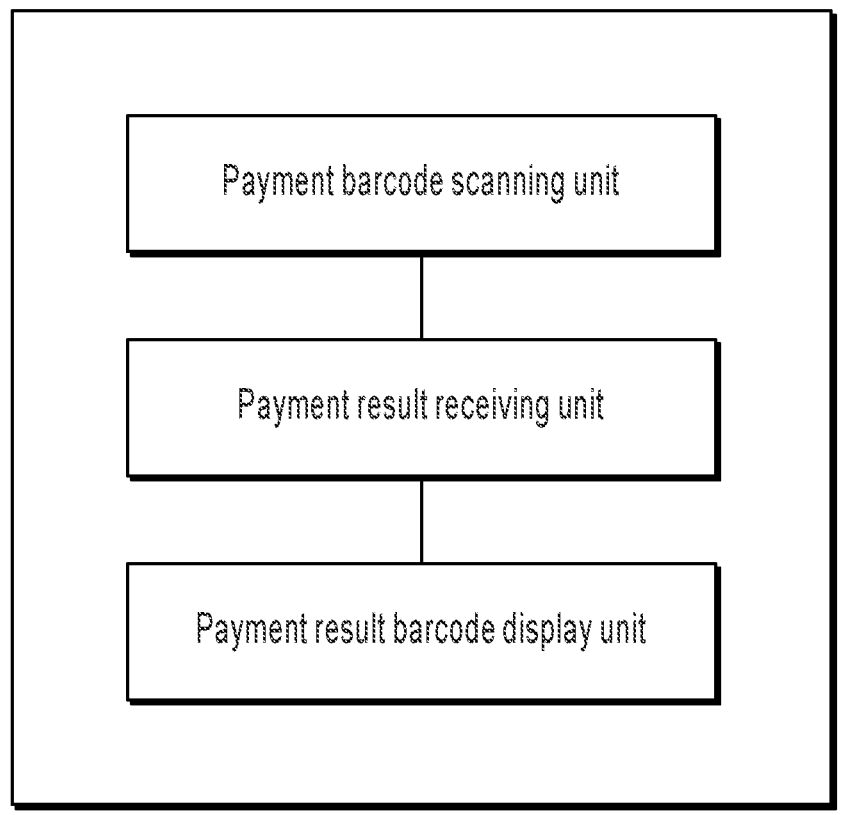
FIG. 11 is a logical structural diagram of a payment implementation apparatus that is applied to a payee device, according to an implementation of the present application.

FIG. 11 shows a payment implementation apparatus, according to an implementation of the present application. The apparatus is applied to a payee device, and includes a payment barcode scanning unit, a payment result receiving unit, and a payment result barcode display unit. The payment barcode scanning unit is configured to scan a payment barcode displayed by a payer device, to obtain payer information that is included in the payment barcode and that includes payer account information. The payment result receiving unit is configured to send a payment request to a payment server, and receive, from the payment server, a payment response that includes a payment result, where the payment request includes the payer account information, payee account information, and a payment amount, and the payment result is generated by the payment server after the payment server makes a payment from a payer account to a payee account based on the payer account information, the payee account information, and the payment amount. The payment result barcode display unit is configured to render the payment result into a payment result barcode, and display the payment result barcode for scanning by the payer device.

In an implementation, the payer information further includes communication control information instructing to return the payment result. The payment result barcode display unit is configured to: in response to determining that the payer information includes the communication control information instructing to return the payment result, render the payment result into the payment result barcode, and display the payment result barcode for scanning by the payer device.

In another implementation, the payment response further includes a notification indicating that the payer device goes offline. The payment result barcode display unit is configured to: in response to determining that the payment response includes the notification indicating that the payer device goes offline, render the payment result into the payment result barcode, and display the payment result barcode for scanning by the payer device.

In an example, the apparatus further includes a waiting process control barcode display unit, where the waiting process control barcode display unit configured to: after the payer information included in the payment barcode is obtained, render waiting process control information into a waiting process control barcode, and display the waiting process control barcode for scanning by the payer device. The waiting process control information includes device control information used to perform at least one of the following: changing a working status parameter of the payer device, or performing a specified function operation.

In the previous example, the device control information includes at least one of the following: turning down screen brightness, or turning off a camera for a predetermined time and then turning on the camera.

In the previous example, the waiting process control barcode further includes communication control information, and the communication control information includes a notification message that instructs the payer device to continue to scan the next barcode.

Figure 12:
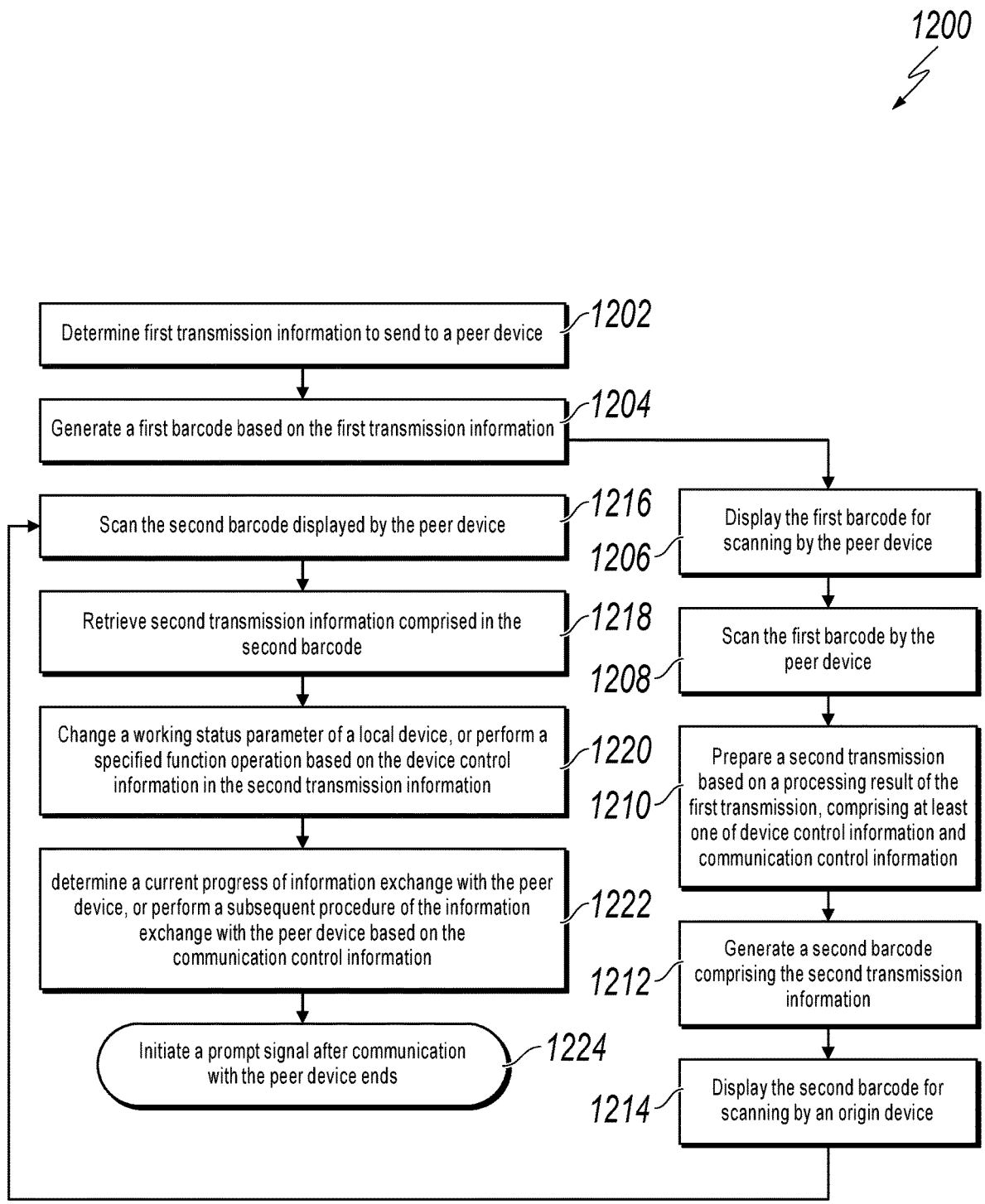
FIG. 12 is a flowchart illustrating an example of a computer-implemented method for barcode based communication, according to an implementation of the present disclosure.

FIG. 12 is a flowchart illustrating an example of a computer-implemented method 1200 for two way communication using barcodes, according to an implementation of the present disclosure. For clarity of presentation, the description that follows generally describes method 1200 in the context of the other figures in this description. However, it will be understood that method 1200 can be performed, for example, by any system, environment, software, and hardware, or a combination of systems, environments, software, and hardware, as appropriate. In some implementations, various steps of method 1200 can be run in parallel, in combination, in loops, or in any order.

At 1202, an origin device, which can be a first device in a pair of devices, or a first device among a plurality of devices, can determine first transmission information to transmit as or in an outgoing transmission to be sent to a peer device. In an example the origin device may be a payer device, and the peer device might be a payee device. The communication between devices might be a financial exchange, such as the purchase of a good or service, wherein funds are transferred from the payer device to the payee device. The outgoing transmission may contain at least one of service information, device control information, or communication control information. The service information is service data related to a service procedure. The device control information may be used to perform at least one of controlling a working status parameter of the peer device or performing a specific function operation. In some instances, the communication control information may be used to notify the peer device of the progress of the current information exchange, or a subsequent procedure of information exchange. From 1202, method 1200 proceeds to 1204.

At 1204, a first barcode is generated based on the first transmission information. Generating the first barcode may include converting the information in the first transmission into the first barcode. The first barcode in the present implementation can be a one-dimensional barcode or a two-dimensional barcode, such as a QR-code. From 1204, method 1200 proceeds to 1206.

At 1206, the first barcode can be displayed by, or otherwise made visually available by the origin device for scanning by the peer device. In one instance, the origin device may be a mobile device, and the first barcode may be displayed on the device screen. From 1206, method 1200 proceeds to 1208.

At 1208, the first barcode is scanned by the peer device. In one example, the peer device may use a front-facing camera to scan the first barcode. In another example, an external scanner that is communicatively coupled with the peer device may be employed to scan the displayed first barcode. From 1208, method 1200 proceeds to 1210.

At 1210, the peer device prepares second transmission information based on a processing result of the first transmission information. In some instances, the second transmission information can contain at least device control information or communication control information. In some instances, the device control information may be used to perform at least one of controlling a working status parameter of the origin device or performing a specific function operation. The communication control information may be used, for example, to notify the origin device of the progress of the current information exchange, as well as or alternatively, a subsequent procedure of information exchange. From 1210, method 1200 proceeds to 1212.

At 1212, a second barcode is generated comprising at least the second transmission information. In some instances the generation of the second barcode may include converting the second transmission information into a second barcode. The second barcode in the present implementation can be a one-dimensional barcode or a two-dimensional barcode. From 1212, method 1200 proceeds to 1214.

At 1214, the second barcode can be displayed by or otherwise made visually available by the peer device for scanning by the origin device. In one instance, the peer device may be a mobile device, and the second barcode may be displayed on the device screen. In another instance, the peer device may have separate display that is commutatively coupled with the peer device and configured to display the second barcode. From 1214, method 1200 proceeds to 1216.

At 1216, the second barcode is scanned by the origin device. In one example, the origin device may use a front-facing camera to scan the second barcode. In another example, an external scanner that is communicatively coupled with the origin device may be employed to scan the displayed second barcode. From 1216, method 1200 proceeds to 1218.

At 1218, the origin device processes the second barcode and retrieves the second transmission information. The retrieval of the second transmission information may be conducted by converting the second barcode back into the second transmission information. From 1218, method 1200 proceeds to 1220.

At 1220, the origin device may, in response to the second transmission information, change a working status parameter locally at the origin device, or perform a specific function based on the device control information received. Examples of this may include the origin device changing screen brightness or activating/deactivating a front-facing camera. From 1220, method 1200 proceeds to 1222.

At 1222, the origin device may determine the progress of information exchange, or need to perform a subsequent procedure of the information exchange with the peer device based on the communication control information received. Examples of this may include "returning a receiving acknowledgement," "continuing to scan next barcode," or "no further information exchange is required." From 1222, method 1200 proceeds to 1224.

At 1224, in response to the origin device determining no further information exchange is required, it may provide a prompt signal such as a tone or a vibration to the user to indicate the exchange of information is complete. After 1224, method 1200 stops.

In particular, example methods include determining outgoing transmission information to be sent to a peer device that contains at least service information, device control information, or communication control information. The service information is service data related to a service procedure. The device control information may be used to perform at least one of: controlling a working status parameter of the peer device, or performing a specific function operation. The communication control information may be used to notify the peer device of the progress of the current information exchange, or a subsequent procedure of information exchange. The outgoing transmission information is then converted to a barcode, and displayed by an origin device for scanning by the peer device.

The peer device then prepares a return transmission based on a processing result of the outgoing transmission. The return transmission contains at least device control information or communication control information. The device control information may be used to perform at least one of: controlling a working status parameter of the origin device, or performing a specific function operation. The communication control information may be used to notify the origin device of the progress of the current information exchange, or a subsequent procedure of information exchange. The return transmission is then converted to a barcode, and received by the origin device.

In response to receiving the return transmission, the origin device may change a working status parameter locally, or perform a specific function based on the device control information received. The origin device may also determine the progress of information exchange, or need to perform a subsequent procedure of the information exchange with the peer device based on the communication control information received. If the origin device determines no further information exchange is required, it may provide a prompt signal such as a tone or a vibration to the user when the exchange of information is complete.

In one implementation, the origin device may be a payer device, and the peer device may be a payee device. In this case, the outgoing transmission may contain payer information including payer account information. The return transmission may be comprised of a payment result barcode, containing payment results that were sent to the payee device from a payment server. The payment result barcode may be displayed in response to determining the payer device is unable to communicate with the payment server. The payer device may transmit in the outgoing transmission that it is unable to communicate with the payment server, and include in the communication control information, instructions for the payee device to generate and display the payment results barcode. The return transmission may be comprised of a waiting process control barcode, which upon scanning by the payer device, causes the payer device to change a working status parameter, or perform a specific function operation based on device control information contained in the waiting process control barcode. For example, the device control information may include adjusting screen brightness and adjusting camera status among other things.

As described herein, the present solution and description relates to implementations of two way communication using barcodes. A technical advantage of this method is that two communication parties can perform bidirectional information transmission using barcodes. This two way communication alleviates information asymmetry caused by unidirectional communication and improves service integrity and security. In an example of a business transaction, a payer is able to confirm successful payment to a payee, without needing to communicate with a payment server, which may not be available for communication. Another advantage to this method is that communication to a remote server, for example, a payment server, need not be established by both parties. Two way communication using barcodes allows one party to obtain information from a remote server via the other party.

The previous descriptions are merely preferred implementations of the present application, but are not intended to limit the present application. Any modification, equivalent replacement, or improvement made without departing from the spirit and principle of the present application should fall within the protection scope of the present application.

In a typical configuration, a computing device includes one or more processors (CPUs), one or more input/output interfaces, one or more network interfaces, and one or more memories.

The memory can include at least one of a non-persistent memory, a random access memory (RAM), or a nonvolatile memory in a computer readable medium, for example, a read-only memory (ROM) or a flash memory (flash RAM). The memory is an example of the computer readable medium.

The computer readable medium includes persistent, non-persistent, removable, and irremovable media that can store information by using any method or technology. The information can be a computer readable instruction, a data structure, a program module, or other data. Examples of the computer storage medium include but are not limited to a phase-change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD), or another optical storage, a cassette, a cassette magnetic disk storage, or another magnetic storage device or any other non-transmission medium. The computer storage medium can be configured to store information that can be accessed by the computing device. As described in the present specification, the computer readable medium does not include computer readable transitory media (transitory media) such as a modulated data signal and a carrier.

It is worthwhile to further note that, the terms "include", "comprise", or their any other variants are intended to cover a non-exclusive inclusion, so a process, a method, a product, or a device that includes a list of elements not only includes those elements but also includes other elements which are not expressly listed, or further includes elements inherent to such a process, method, product, or device. Without more constraints, an element preceded by "includes a . . . " does not preclude the existence of additional identical elements in the process, method, product, or device that includes the element.

A person skilled in the art should understand that an implementation of the present application can be provided as a method, a system, or a computer program product. Therefore, the present application can use a form of hardware-only implementations, software-only implementations, or implementations with a combination of software and hardware. In addition, the present application can use a form of a computer program product that is implemented on one or more computer-usable storage media (including but not limited to a disk memory, a CD-ROM, an optical memory, etc.) that include computer-usable program code.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for barcode-based communication, the computer-implemented method comprising:
    determining, by one or more processors of a first device, first transmission information to send to a second device, the first transmission information comprising a service request, a user account information, and an indication that the first device is unable to communicate with a remote server;
    generating, by the one or more processors of the first device, a first barcode based on the first transmission information;
    displaying, by the first device, the first barcode for scanning by the second device;
    scanning, by the first device a second barcode displayed by the second device, the second barcode comprising second transmission information generated by the second device based on a processing result of the first transmission information, the second transmission information comprising a service result and a display adjustment request specifying a first device display parameter modification, wherein the display parameter comprises a screen brightness and a camera status;
    retrieving, by the one or more processors of the first device, the second transmission information by processing the second barcode;
    adjusting, by the one or more processors of the first device, the display parameter of the first device based on the display adjustment request of the second transmission information; and
    in response to adjusting the display parameter, redisplaying, by the first device, the first barcode for scanning by the second device to complete a service without connecting to the remote server.

2. The computer-implemented method of claim 1, wherein the first transmission information comprises at least one of service information, device control information and communication control information.

3. The computer-implemented method of claim 2, wherein the first transmission information comprises device control information and communication control information, the device control information being used to perform at least one of: controlling a working status parameter of the second device, and performing a specific function operation, and wherein the communication control information is used to notify the second device of at least one of a current progress and a subsequent procedure of information exchange.

4. The computer-implemented method of claim 1, wherein the second transmission information further comprises instructions for at least one of:
    changing a working status parameter of a local device based on the display adjustment request in the second transmission information;
    performing a specific function operation based on the display adjustment request in the second transmission information;
    determining a current progress of information exchange with the second device based on the display adjustment request in the second transmission information; and
    performing a subsequent procedure of the information exchange with the second device based on communication control information in the second transmission information.

5. The computer-implemented method of claim 1, wherein the method further comprises: initiating a prompt signal after communication with the second device ends.

6. The computer-implemented method of claim 5, wherein the prompt signal comprises at least one of a vibration and a tone, indicating communication with the second device has ended.

7. The computer-implemented method of claim 1, wherein the second device comprises a payee device and the first device comprises a payer device, and wherein the first barcode is a payment barcode comprising payer account information.

8. The computer-implemented method of claim 7, wherein scanning the second barcode comprises:
    scanning a payment result barcode displayed by the payee device; and
    obtaining, from the payment result barcode, a payment result, wherein the payment result is sent by a payment server to the payee device in response to the payment server making a payment from a payer account to a payee account based on a payment request comprising the payer account information.

9. The computer-implemented method of claim 8, wherein the scanning a payment result barcode displayed by the payee device comprises:
    scanning the payment result barcode after the payment barcode is displayed for a predetermined display time.

10. The computer-implemented method of claim 9, wherein the method further comprises:
    prior to the scanning a payment result barcode displayed by the payee device, scanning a waiting process control barcode displayed by the payee device, and:
    changing a working status parameter of the payer device.

11. The computer-implemented method of claim 8, wherein the scanning the payment result barcode displayed by the payee device occurs in response to a determination that the payer device cannot communicate with the payment server.

12. The computer-implemented method of claim 11, wherein the payer information further comprises communication control information comprising instructions to the payee device to generate and display the payment result barcode.

13. A non-transitory, computer-readable medium storing one or more instructions executable by a computer system to perform operations comprising:
    determining, by one or more processors of a first device, first transmission information to send to a second device, the first transmission information comprising a service request, a user account information, and an indication that the first device is unable to communicate with a remote server;
    generating, by the one or more processors of the first device, a first barcode based on the first transmission information;
    displaying, by the first device, the first barcode for scanning by the second device;
    scanning, by the first device a second barcode displayed by the second device, the second barcode comprising second transmission information generated by the second device based on a processing result of the first transmission information, the second transmission information comprising a service result and a display adjustment request specifying a first device display parameter modification, wherein the display parameter comprises a screen brightness and a camera status;

retrieving, by the one or more processors of the first device, the second transmission information by processing the second barcode;

adjusting, by the one or more processors of the first device, the display parameter of the first device based on the display adjustment request of the second transmission information; and in response to adjusting the display parameter, redisplaying, by the first device, the first barcode for scanning by the second device to complete a service without connecting to the remote server.

14. The computer-readable medium of claim 13, wherein the second transmission information further comprises instructions for at least one of:

changing a working status parameter of a local device based on the display adjustment request in the second transmission information;

performing a function operation based on the display adjustment request in the second transmission information;

determining a current progress of information exchange with the second device based on the display adjustment request in the second transmission information; and performing a subsequent procedure of the information exchange with the second device based on communication control information in the second transmission information.

15. The computer-readable medium of claim 14, wherein the second transmission information is used to perform at least one of:

controlling a working status parameter of the second device, and performing a specific function operation comprising a notification of the peer device of at least one of a current progress and a subsequent procedure of information exchange.

16. The computer-readable medium of claim 13, wherein the second device comprises a payee device and the first device comprises a payer device, and wherein generating the first barcode is a payment barcode comprising payer account information.

17. The computer-readable medium of claim 16, wherein scanning the second barcode comprises:

scanning a payment result barcode displayed by the payee device; and obtaining, from the payment result barcode, a payment result, wherein the payment result is sent by a payment server to the payee device in response to the payment server making a payment from a payer account to a payee account based on a payment request comprising the payer account information.

18. The computer-readable medium of claim 17, wherein the scanning the payment result barcode displayed by the payee device comprises:

scanning the payment result barcode after the payment barcode is displayed for a predetermined display time.

19. The computer-readable medium of claim 18, wherein the operations further comprise:

prior to the scanning a payment result barcode displayed by the payee device, scanning a waiting process control barcode displayed by the payee device, and:

changing a working status parameter of the payer device.

20. The computer-readable medium of claim 18, wherein the scanning the payment result barcode displayed by the payee device, occurs in response to determining that the payer device cannot communicate with the payment server, and wherein the payer information further comprises communication control information comprising instructions to the payee device to generate and display the payment result barcode.

\* \* \* \* \*